United States Patent [19]
Hascher-Reichl et al.

[11] Patent Number: 4,475,690
[45] Date of Patent: Oct. 9, 1984

[54] MAGNETIC VALVE, IN PARTICULAR A FUEL INJECTION VALVE

[75] Inventors: Asta Hascher-Reichl, Stuttgart; Hans Kubach, Korntal; Werner Gross, Ismaning, all of Fed. Rep. of Germany

[73] Assignee: Robert Bosch GmbH, Stuttgart, Fed. Rep. of Germany

[21] Appl. No.: 417,974

[22] Filed: Sep. 14, 1982

[30] Foreign Application Priority Data

Oct. 6, 1981 [DE] Fed. Rep. of Germany ....... 3139669

[51] Int. Cl.[3] ......................... B05B 1/30; F16K 31/02
[52] U.S. Cl. .................................... 239/585; 251/141; 251/129
[58] Field of Search ................ 239/585; 251/129, 139, 251/141

[56] References Cited

U.S. PATENT DOCUMENTS 3,913,537 10/1975 Ziesche et al. ...................... 239/585
4,373,671 2/1983 Giardini ............................. 239/585

*Primary Examiner*—Andres Kashnikow
*Assistant Examiner*—James R. Moon, Jr.
*Attorney, Agent, or Firm*—Edwin E. Greigg

[57] ABSTRACT

A magnetic valve is proposed, in particular a fuel injection valve for internal combustion engines, which has a valve housing, a conductor coil mounted on a core of ferromagnetic material, and an armature which carries a valve body cooperating with a valve seat. The core has an inner cylinder and an outer cylinder, which are magnetically conductively connected with one another at one end face via a yoke. At the other end face, a circular-annular plate is magnetically conductively connected with the outer cylinder. The magnetic circuit is closed between the circular-annular plate and the inner cylinder via an armature, which has a plate-like element and a hollow cylindrical strut. The strut is located opposite the inner cylinder and with it forms a first air gap. The rim of the plate-like element of the armature is located opposite the circular-annular plate and with it forms a second air gap.

19 Claims, 1 Drawing Figure

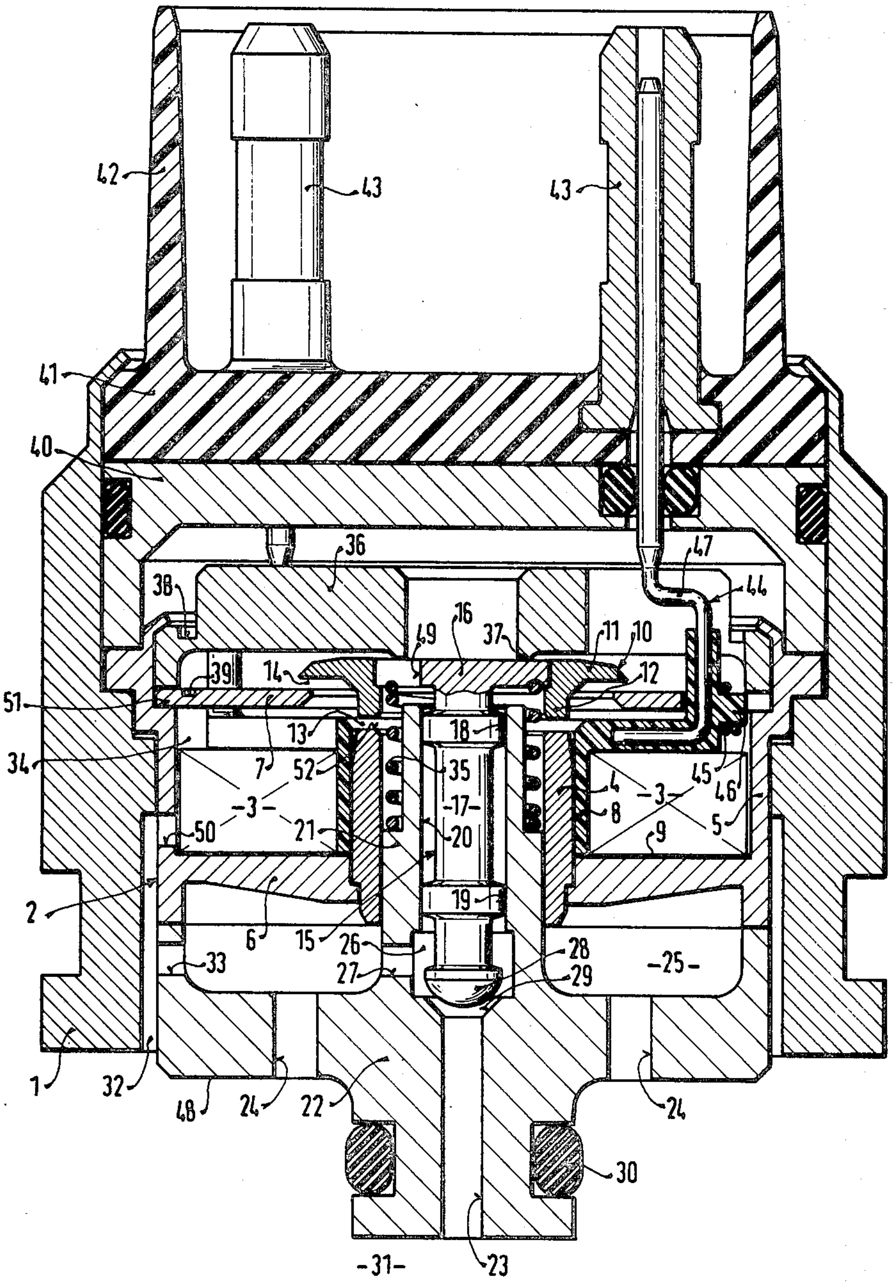
42
43
43
41
40
36
47
44
38
16
49
37
11
10
39
14
12
51
13
18
34
7
52
35
3
4
3
45
46
8
-17-
3
21
50
9
5
20
2
19
6
15
26
28
-25-
33
27
29
1
32
48
24
22
24
30
-31-
23

MAGNETIC VALVE, IN PARTICULAR A FUEL INJECTION VALVE

BACKGROUND OF THE INVENTION

The invention is based on a magnetic valve, in particular a fuel injection valve for fuel injection systems of internal combustion engines having a valve housing, a conductor coil mounted on a core of ferromagnetic material and an armature, which carries a valve body cooperating with a valve seat.

A fuel injection valve of this kind is already known from German patent application No. P 30 46 889.4, in which the valve element which is firmly connected with the flat armature passes through a central guide opening of a guide diaphragm. The guide diaphragm guides the valve element in the radial direction with respect to the valve seat. With a concentric guide edge, the flat armature, being stressed by a spring, touches the guide diaphragm and is thus guided in a parallel plane to the end face of the core, which is embodied as a shell core. The supply of fuel to the valve is effected through radial inlet openings in the valve wall. The nonmetered fuel, after flowing through the magnetic element, can flow back into a fuel return line via radial outflow openings which are axially offset and sealed off with respect to the inflow openings.

This fuel injection valve taken as a whole is very massive. The air gaps which are formed by the armature with the shell core are located very far apart from one another with respect to the circumference, so that the armature must have a large diameter; this increases its mass and reduces its flexibility. Furthermore the guidance of the valve element and of the armature is not always sufficiently good, despite the guide diaphragm.

OBJECT AND SUMMARY OF THE INVENTION

The magnetic valve according to the invention and further delineated hereinafter has the advantage over the prior art that its mass is small and thus it is light in weight. By means of the specialized embodiment of the magnetic circuit, the magnetic valve has very short switching times. The shape of the armature means that the distance between the air gaps with respect to the diameter of the armature is short. Thus the advantages of the known flat armature (twice the force with an identical magnetic flux by means of two force-generating air gaps) are utilized without producing its disadvantage, namely the fact that the outer gap is geometrically very widely spaced, which increases the armature mass and reduces the flexibility of the armature. A sufficient spatial separation in order to reduce the stray magnetic flux is available in the present invention because the air gaps are offset, as viewed in the axial direction.

By means of further characteristics disclosed in this application advantageous further embodiments and improvements are possible. By means of the disposition of the guide bushing and the spring inside the inner cylinder, the inner diameter of the magnetic circuit is constructively enlarged. Thus the circumferential length of the air gaps is increased while the surface area remains the same, as a result of which the magnetic force increases yet the wall thickness remains constant. One bearing point of the valve push rod in the cylinder bore is located in the immediate vicinity of the air gaps, so that only slight tilting forces arise because of tolerances of the air gaps. Thus the second bearing point can be disposed at a short distance from the first bearing point, so that the armature can be lightweight in structure and have a very high and easily damped mechanical inherent frequency.

Because of the structure according to the invention, the mechanical forces are substantially kept away from the magnetic circuit so that the magnetic elements can be realized as minimally as is optimal for the magnetic circuit. As a result of the greater mass of the stop plate in comparison with the mass of the armature having the valve body, the noise of impact is mechanically damped rapidly, and the raised portions of the stop plate reinforce the damping effect. The armature arrives at the stop plate in the vicinity of the disk-like head of the valve body, which is made of anti-magnetic and mechanically hard material so that long service life is assured.

The functionally essential data such as stroke time and switching time can be adjusted at favorable cost by means of plastic deformation at the circular-annular grooves in the stop plate and in the circular-annular magnetic plate. Presetting of these data is possible by pairing the mass tolerances of the annular magnetic plate and of the magnetic armature.

The magnetic conductors adjoining the air gaps, such as the armature, circular-annular plate and inner cylinder, are fabricated of magnetic material having a high saturation induction, while the remaining elements of the magnetic circuit are fabricated from magnetic material having the most favorable possible dynamic properties.

As a result, not only is high force at a low magnetic flux attained, but also a great change in the magnetic flux in accordance with the stroke in the vicinity of the impact.

The valve push rod with the magnetic armature, like the cylinder bore in the guide bushing with the valve seat, can each be machined in one holding tool, necessarily producing circular symmetry.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention in the form of a section taken through the magnetic valve according to the invention, which is described in greater detail below.

DESCRIPTION OF THE PREFERRED EMBODIMENT

In the magnetic valve according to the invention shown in the drawing, the valve housing is indicated by reference numeral 1. A core 2 of ferromagnetic material is provided inside the valve housing 1, and a conductor coil 3 is mounted on the core 2. The core 2 has an inner cylinder 4 and an outer cylinder 5, which are disposed concentrically with respect to one another. The inner cylinder 4 and outer cylinder 5 are magnetically conductively connected to one another at one end face via a yoke 6. The other end face is partially covered by a magnetically conductive circular-annular plate 7, which is connected in a magnetically conductive manner with the outer cylinder 5. The inner cylinder 4 which occupies the entire space between the inner and outer cylinders 4, 5 carries a coil body 8, onto which the conductor coil 3 is would. Between the conductor coil 3 and the yoke 6 there is an insulating foil 9, which has a low heat resistance. The magnetic circuit interrupted between the inner cylinder 4 and the circular-annular plate 7 is bridged over by an armature 10. The armature 10 has a plate-like element 11, which merges with a hollow-cylindrical strut 12. The strut 12 faces one end face of the inner cylinder 4. The first air gap 13 is located between the cylinder and the strut. The rim, or margin means of the plate-like element 11 protrudes outward beyond the circular-annular plate 7 and with it forms a second air gap 14. A valve body 15 of anti-magnetic material, which has a disk-like head 16 and a push rod 17, is pressed with its disk-like head 16 into an aperture in the plate-like part 11 of the armature 10. The valve body 15 is guided in the cylinder bore 20 of a guide bushing 21 with two bearing points 18, 19. The guide bushing 21 merges with an anti-magnetic element 22, which in an extension of the cylinder bore of the guide bushing 21 has the inlet 23 and the discharge bores 24. The bores 24 discharge into a chamber 25, which is formed by the anti-magnetic element 22 and the core 2. The inlet 23 terminates in a valve chamber 26, which communicates with the hollow chamber 25 by means of a connecting bore 27. The valve body 15, with its ball-like end 28, cooperates with a valve seat 29 which is disposed between the valve chamber 26 and the inlet 23. The O-rings 30 seal off the high pressure in the zone 31 from the low fluid pressure (return flow pressure) in the valve chamber 26, the connecting bore 27, the hollow chamber 25, the discharge bores 24 and all the other hollow chambers of the magnetic valve. A gap 32 is provided between the anti-magnetic element 22, a portion of the outer cylinder 5, and the valve housing 1. A pressure relief line 33 is located between the hollow chamber 25 and the gap 32. The coil chamber 34 is cooled with fluid via the gap 32 and the bore 50, which is provided in the outer cylinder and connects the coil chamber 34 with the gap 32.

The guide bushing 21 has a recess on its outer jacket, into which a spring 35 is placed and which with its other end presses against the disk-like head 16 of the valve body 15 which as indicated earlier is placed into an aperture in the plate-like element 11 of the armature 10. The spring 35 reinforces the hydraulic pressure exerted on the ball-like end 28 of the push rod 17 in such a manner that the valve opens rapidly when the current is shut off and also remains in this position without pressure.

A stop plate 36 is provided above the armature 10 and the circular-annular plate 7. With the aid of this stop plate 36, the impact upon the opening of the valve is damped rapidly. In the vicinity of the impact, the stop plate 36 has a raised protrusion 37, so that the armature 10 strikes only against a defined surface area. This protrusion 37 is located opposite the disk-like head 16 pressed into the armature 10 and made of hard, anti-magnetic material, so that even over long-term use of the magnetic valve, wear is very low. A groove 38 is provided in the stop plate 36 to weaken the anti-magnetic stop plate 36 to such an extent that this plate can be plastically deformed at that location in order to adjust the system.

A further groove 39 is provided in the circular-annular plate 7 of magnetic material, which can be plastically deformed at that location in such a manner that the second air gap 14 can be functionally adjusted. This deformation should be possible after the mounting of the stop plate 36, so that the stop plate 36 is penetrated in order to exert the forces upon the upper side of the circular-annular plate 7.

The magnetic valve is sealed off by a metal cover plate 40 and by an electrically insulating plastic element 41 mounted on the cover plate 40, these sealing elements being recessed into the valve housing 1. The connecting pins 43 are encapsulated into the plastic element 41 having the plug guides 42. The electrical connection of the connecting pins 43 with the coil 3 is effected via the current supply lines 44. These are injected into the coil body 8. The electrical conductor wires 45 of the coil 3 are wrapped at their ends about a tang 46 which is a component of the coil body 8, in order to assure a relief of tension. The end of the conductor wire 45 is welded onto a lug, not shown, of the current supply line 44. The current supply line 44 is passed into the electrically conductive connecting pin 43 via a bend 47 in order to relieve tension.

When the valve is blocked, a high pressure is created in the inlet 23, which is exerted as force upon the zone 31 of the anti-magnetic element 22. In order to preclude interfering mechanical deformations of the outer cylinder and of the inner cylinder 4 because of this force, the anti-magnetic element 22 is embodied so sturdily in the zone 48 that the force can be directed onto the circumference of the outer cylinder 5 even though the outer cylinder 5 is as thin as is required in terms of an optimal magnet design with respect to switching times.

A bore 49 is provided in the disk-like head 16 of the armature 10, and the fluid positively displaced during the filling stroke of the push rod 17 is capable of flowing back through this bore 49 as well as through the pressure relief bore 33.

In order to simplify the pairing of mass tolerances of the annular plate 7 and the armature 10, the shoulder 51 of the magnetic outer cylinder 5 and the pole 52 of the magnetic inner cylinder 4 oriented toward the first air gap 13 are of equal height in the axial direction.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A magnetic valve for a fuel injection system of an internal combustion engine, said valve having a valve housing, a conductor coil mounted on a core of ferromagnetic material in said housing, an armature carrying a valve body cooperating with a valve seat, said armature including a plate-like element and a strut, said core including an inner cylinder and an outer cylinder, said cylinders being disposed concentrically with respect to one another and between which said conductor coil is disposed, each of said cylinders having end faces connected magnetically with one another, at least one of said end faces being connected via a yoke and said other end face being partially covered by a circular-annular magnetically conductive plate means connected in a magnetically conductive manner with said outer cylinder, said strut being located opposite said core inner cylinder and forming a first air gap between said armature and said core, and said plate-like element having margin means overlapping said circular-annular plate and forming a second air gap between said armature and said core, the thickness of said second air gap being reduced simultaneously with reduction of the first air gap upon attraction of the armature toward said magnetic core.

2. A magnetic valve as defined by claim 1, in which said inner cylinder, said circular-annular plate and said armature are made of a material having a high magnetic saturation induction.

3. A magnetic valve as defined by claim 1 in which said valve body is of anti-magnetic material and includes a push rod means including a disk-like head connected with said armature in proximity to said plate-like element, said push rod being guided in a cylinder bore of a guide bushing.

4. A magnetic valve as defined by claim 3, in which said disk-like head is is seated on said plate-like element of said armature.

5. A magnetic valve as defined by claim 3 or claim 4, in which said guide bushing is provided with a recess receiving a spring means which presses against said armature and holds said armature in such a manner that said valve body is raised from the valve seat when said conductor coil is inoperative.

6. A magnetic valve as defined by claim 3 or 4, in which said guide bushing and said spring are disposed inside said inner cylinder of said core.

7. A magnetic valve as defined by claim 3 or 4, in which said push rod is guided in said cylinder bore of said guide bushing by means of two bearing points, one of said bearing points being located in proximity to said first air gap.

8. A magnetic valve as defined by claim 1, in which said armature is in close proximity to a stop plate of hard, anti-magnetic material and said armature is arranged to strike against said stop plate.

9. A magnetic valve as defined by claim 8, in which said armature strikes against said stop plate in the vicinity of said disk-like head.

10. A magnetic valve as defined by claim 8 or 9, in which said stop plate has an annular groove permitting plastic deformation of said plate to provide for adjustment.

11. A magnetic valve as defined by claim 1, in which said circular-annular plate has an annular groove permitting plastic deformation of said plate for adjustment of said second air gap.

12. A magnetic valve as defined by claim 8 or 9, in which said stop plate has a mass which is greater than the combined mass of said armature and said valve body.

13. A magnetic valve as defined by claim 8 or 9, characterized in that said stop plate has a portion elevated above said armature and against which said armature strikes so that the armature strikes only against a defined surface area.

14. A magnetic valve as defined by claim 8 or 9, in which said stop plate is provided with at least one aperture.

15. A magnetic valve as defined by claim 3 or 4, in which said valve housing has a portion which is integral with said guide bushing, said portion further provided with a valve seat and inlet and discharge bores.

16. A magnetic valve as defined by claim 1, in which said inner and outer cylinders, together with said yoke and said circular-annular plate provide a coil chamber which has an approximately square cross section.

17. A magnetic valve as defined by claim 16, in which said outer cylinder further includes a bore through which the fluid passes into said coil chamber.

18. A magnetic valve as defined by claim 15, in which said valve seat and said cylinder bore of said guide bushing are machined from one piece of material.

19. A magnetic valve as defined by claim 18, in which said outer cylinder further includes an annular shoulder and said inner cylinder includes a pole oriented toward said first air gap, said annular shoulder and pole being of equal height in an axial direction.

* * * * *